(12) United States Patent
Wood et al.

(10) Patent No.: US 10,810,568 B1
(45) Date of Patent: Oct. 20, 2020

(54) METHODS FOR AUDITING SHOPPING, RELATED DEVICES, AND ARTICLES OF MANUFACTURE

(71) Applicant: Toshiba Global Commerce Solutions Holdings Corporation, Tokyo (JP)

(72) Inventors: Kimberly Wood, Raleigh, NC (US); Craig Compton, Wake Forest, NC (US); Daniel Hunt, Wake Forest, NC (US); Barry Stewart, Durham, NC (US)

(73) Assignee: Toshiba Global Commerce Solutions Holdings Corporation (JP)

( * ) Notice: Subject to any disclaimer, the term of this patent is extended or adjusted under 35 U.S.C. 154(b) by 0 days.

(21) Appl. No.: 16/369,816

(22) Filed: Mar. 29, 2019

(51) Int. Cl.
    *G06Q 20/20*     (2012.01)
    *G01G 19/414*     (2006.01)
    *A47F 9/04*     (2006.01)

(52) U.S. Cl.
    CPC .......... *G06Q 20/208* (2013.01); *A47F 9/048* (2013.01); *G01G 19/4144* (2013.01); *G06Q 20/204* (2013.01)

(58) Field of Classification Search
    CPC .................................................. G06Q 20/208
    USPC ...................... 235/383, 375, 380; 705/15, 16
    See application file for complete search history.

(56) References Cited

U.S. PATENT DOCUMENTS

| | | | | |
|---|---|---|---|---|
| 6,145,629 A * | 11/2000 | Addy | ...................... | A47F 9/048 186/61 |
| 2006/0038007 A1 * | 2/2006 | Dickover | ................. | A47F 9/046 235/383 |
| 2008/0121702 A1 * | 5/2008 | Fortenberry | ....... | G01G 19/4144 235/383 |
| 2011/0295704 A1 * | 12/2011 | Edwards | ............... | G06Q 20/208 705/16 |
| 2011/0320296 A1 * | 12/2011 | Edwards | ................. | G06Q 20/20 705/23 |
| 2013/0132214 A1 * | 5/2013 | Hulett | ..................... | G06Q 30/00 705/15 |

(Continued)

OTHER PUBLICATIONS

Lotus Trolley Bag, https://www.lotustrolleybag.com/, Mar. 28, 2019.

(Continued)

*Primary Examiner* — Allyson N Trail
(74) *Attorney, Agent, or Firm* — Stanek Lemon Crouse & Meeks, PA (57) ABSTRACT

A non-transitory computer-readable medium whose contents, when executed by a computing system, can cause the computing system to perform operations for an audited shopping system that include receiving scanned product information identifying a current product and an associated weight of the current product. An indication can be determined to place the current product in a selected bag among a plurality of bags. The associated weight of the current product can be added to a previous calculated weight of products in the selected bag to provide a current calculated weight of products in the selected bag and then all previous operations can be repeated until receiving an indication that shopping is done to provide a plurality of products that are distributed among the plurality of bags, wherein each bag has a respective calculated weight of all products in the bag and indicating a selected one of the plurality of bags as an audited bag for weighing.

17 Claims, 7 Drawing Sheets

(56) References Cited

U.S. PATENT DOCUMENTS

2016/0063471 A1* 3/2016 Kobres ............ G06Q 20/40145
                                                    705/18
2018/0330346 A1* 11/2018 Grassadonia .......... G06Q 20/10

OTHER PUBLICATIONS

Newly Released Grocery Utility Flat Shopping Cart with 360° Rolling Swivel Wheels Heavy Duty & Light Weight Extra Large Utility Cart, by Winibest, https://www.amazon.com/Released-Grocery-Utility-Folding-Shopping/dp/B07HNTFSY4/ref=pd_ipo_vtph_201_bs_tr_t_1?_encoding=UTF8&psc=1&refRID=3KSH3H1QRNG7P22Y0D6T, Mar. 28, 2019.

Folding Shopping Cart, Stair Climbing Cart Trolly Grocery Laundry Utility Cart with Wheel & Removable Waterproof Canvas Bag, by Korie, https://www.amazon.com/Shopping-Climbing-Removable-Waterproof-Capacity/dp/B07HP27Z2S/ref=pd_ipo_vtph_201_lp_t_2?_enconding=UTF8&psc=1&refRID=3KSH3H1QRNG7P22Y0D6T, Mar. 28, 2019.

Stair Climber Bigger Trolley Dolly Baroque Grocery Shopping Foldable Cart Condo Aparatment, by dbest products, https://www.lotustrolleybag.com/, Mar. 28, 2019.

\* cited by examiner

METHODS FOR AUDITING SHOPPING, RELATED DEVICES, AND ARTICLES OF MANUFACTURE

FIELD

The present invention relates to the field of point of sale systems in general, and more particularly, to bagging systems for point of sale systems.

BACKGROUND

Self-checkout systems are commonly used by consumers at retail locations such as grocery stores. In operation, the user can scan items at the self-checkout system and place the scanned items into a bag located on a scale of the self-checkout system. When the item is scanned, the self-checkout system accesses data that indicates information about the scanned item, such as a specified weight. The self-checkout system can then compare the specified weight with the measured weight provided by the scale. In this way, the self-checkout system can verify that the scanned items are the ones placed into the bag.

SUMMARY

Embodiments according to the present invention can provide methods for auditing shopping, related devices, and articles of manufacture. Pursuant to these embodiments, a non-transitory computer-readable medium whose contents, when executed by a computing system, can cause the computing system to perform operations for an audited shopping system that include receiving scanned product information identifying a current product and an associated weight of the current product. An indication can be determined to place the current product in a selected bag among a plurality of bags. The associated weight of the current product can be added to a previous calculated weight of products in the selected bag to provide a current calculated weight of products in the selected bag and then all previous operations can be repeated until receiving an indication that shopping is done to provide a plurality of products that are distributed among the plurality of bags, wherein each bag has a respective calculated weight of all products in the bag and indicating a selected one of the plurality of bags as an audited bag for weighing.

In some embodiments, a method of operating an audited shopping system can include receiving scanned product information identifying a current product, an associated weight of the current product, and an associated price of the current product. An indication can be received from a shopper to place the current product in a selected bag among a plurality of bags in a shopping cart. The associated weight of the current product can be added to a previous calculated weight of products in the selected bag to provide a current calculated weight of products in the selected bag. The associated price of the current product can be added to a previous calculated price of products in the selected bag to provide a current calculated cost of products in the selected bag and then all preceding operations can be repeated until receiving an indication that shopping is done to provide a plurality of products that are distributed among the plurality of bags, wherein each bag has a respective calculated weight of all products in the bag and a respective calculated cost of all products in the bag. A selected one of the plurality of bags can be indicated as an audited bag for weighing.

In some embodiments, a method of operating an audited shopping system can include receiving scanned product information identifying a current product, an associated weight of the current product, and an associated price of the current product. Which one of a plurality of bags in a shopping cart of a shopper can be determined in which to place the current product to provide a selected bag at a remote server. The associated weight of the current product can be added to a previous calculated weight of products in the selected bag to provide a current calculated weight of products in the selected bag. The associated price of the current product can be added to a previous calculated price of products in the selected bag to provide a current calculated cost of products in the selected bag and then repeating all preceding operations until receiving an indication that shopping is done to provide a plurality of products that are distributed among the plurality of bags, wherein each bag has a respective calculated weight of all products in the bag and a respective calculated cost of all products in the bag. A selected one of the plurality of bags can be indicated as an audited bag for weighing.

In some embodiments, a shopping cart system can include a frame including an upper portion and a lower portion, the frame configured to hang a plurality of shopping bags therefrom and a base located proximate to the lower portion of the frame, the base including a plurality of wheels arranged to contact a level floor surface, the base having an lower opening facing the level floor surface and configured to allow a weight cell to moveably extend into the frame through the lower opening to selectively contact at least one of the plurality of shopping bags hanging from the frame.

DETAILED DESCRIPTION OF EMBODIMENTS ACCORDING TO THE INVENTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, some store shopping systems allow shoppers to scan and bag items as they shop as part of a reduced friction checkout experience. In those systems, the shopper may register in advance by supplying an electronic form of payment such that when the shopper is finished, payment can be made by via a mobile electronic device, such as a mobile phone or store provided device, without a conventional checkout process.

As further appreciated by the present inventors, these types of reduced friction checkout processes may be accompanied by an auditing system to ensure accuracy and reduce theft etc. This type of auditing may require a detailed examination of the items purchased by the shopper such as by weighing each of the shopper's bags.

Accordingly, in some embodiments according to the invention, an audited shopping system can be provided whereby the shopper places the scanned items in particular bags so that the system can determine which scanned items are in which of the shopper's bags. In this way, when an audit is conducted, a particular one (or ones) of the shopper's bag can be selected for weighing. The audited shopping system can compare the calculated weight of the contents of a particular bag(s) with the actual measured weight of that bag(s) to determine compliance.

In some embodiments, the shopper can decide which bag to place the scanned items into and then provide the number of the bag, for example, to the system via the device. The system can tabulate the items that are placed into each bag and can determine the weight that each bag should hold at the end of the shopping trip. This approach can provide the shopper with a great deal of flexibility in how the items are bagged (such as cold items together, vegetables together etc.).

In still other embodiments, the shopper may shop for multiple parties (sometimes referred to herein as a multi-shopper) during the same trip and bag all of of the items purchased for a particular party is specific bags. For example, one party may want a particular brand of bread (placed in a first bag) whereas a second party may want a different brand of bread (placed in a second bag). In such an approach, the shopper may enter (or otherwise provide access to) payment information that is associated with the other parties. When shopping is completed, the shopper may pay for each of the other party's items using their respective payment information.

In other embodiments, the shopper may elect to have the system direct how to bag items as they are scanned. For example, rather than have the shopper input the bag number, the system directs the shopper as to which bag the item should be placed in. During the audit portion, the system has pre-determined the weight of each bag without requiring the input from the shopper and, moreover, the system can distribute the items amongst the bags, for example, to maximize the weight difference between the bags so as to improve the accuracy of the audit system.

In still further embodiments, the system can tabulate an audit score for the shopper and set the frequency, for example, of the auditing process based on the results. For example, in some embodiments, the system may allow the shopper to skip the audit process completely once the shopper has accumulated a significant number of error-free audits and/or when the total value of the scanned items for the current shopping trip is relatively low. In still other embodiments, the audit scoring can be "gamified" to create competition between shoppers to gain more benefits from the system.

Figure 1:
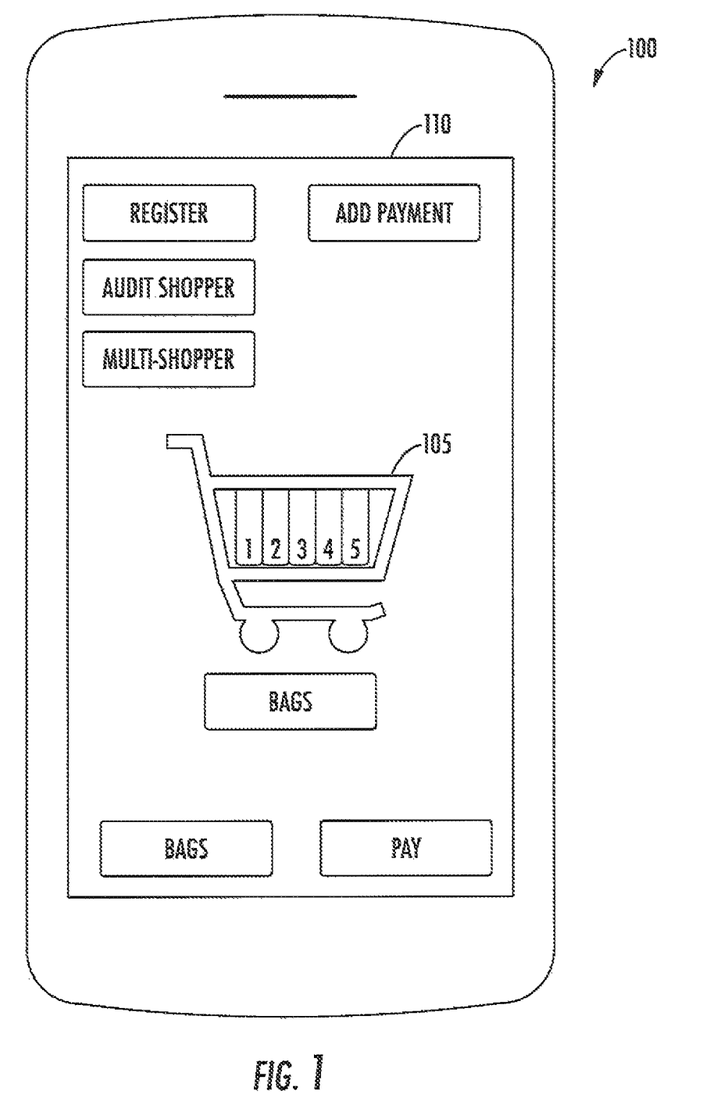
FIG. 1 is a schematic illustration of a mobile device configured to operate in an audited shopping system in some embodiments according to the invention.

FIG. 1 is a schematic illustration of a mobile device 100 configured to operate in an audited shopping system. In some embodiments, according to the invention as shown in figure one comma. The mobile device 100 can include a screen 110 that displays icons and buttons that may be used by a shopper during a shopping trip in the audited system.

The buttons can instantiate particular operations within the audited shopping system. For example, a Register button enables the shopper to provide identification information associated with their identity in a loyalty program. The loyalty program can provide information on, for example, the products purchased frequently by the shopper which can be used to determine the shopper's audit score which in-turn can affect whether the system selects the shopper for auditing and/or which of the shopper's bags is selected for auditing.

The display 110 can also provide buttons that select the shopping mode in which the present shopping trip. For example, the display 110 may provide buttons for an "Audit shopper" mode and a "Multi-shopper" mode. In the Audit shopper mode the shopper allows the system to select the bag for each scanned item. In this mode, therefore, the system can pre-determine the weight for each of the bags and the types of items that are grouped together. This approach can also avoid the requirement of having the shopper input the bag for each scanned item, which may be more error prone. The system can also use the Audit shopper mode to maximize the placement of different items among the bags to, for example, maximize the difference in weight between the different bags to ensure increased accuracy of the audit.

The multi shopper button enables the shopper to shop for multiple parties during the same trip. In the multi shopper mode the shopper can scan and place items in particular bags (selected) by the shopper. For example, the multi shopper mode may allow the shopper to place similar items in different bags if those similar items are to be purchased for different parties such as a friend or a relative. This mode also enables the system to determine the content of each bag as the items are scanned so that during the audit process the system can determine compliance by weighing a selected one of the bags and comparing the weight of the selected bag to the projected weight of that bag as determined during scanning and bagging. It will be understood that the operations carried out during the multi shopper mode may also be carried out in other modes (that do not involve shopping for others) such as when the shopper would like the items bag a particular way. The display 110 can also provide an Add Payment button to provide payment information for the shopper as well as respective payment information for other parties.

In some embodiments, multi shopper mode the display 110 can also provide an icon or other indicia of a shopping cart 105 including graphical representations of a plurality of bags 1-5 in the cart 105. For example, the shopper may select the bag in which the item will be placed by touching the icon that corresponds to a particular bag rather than entering a number. In the audit shopper mode, the system may highlight the particular bag into which the item should be placed after being scanned. It will be understood that fewer or a greater number of bags may be used.

The display 110 can also include a Bags button that may be utilized to add additional bags to the shopping cart 105 if for example, during the shopping trip, additional bags are needed to store items. In response, the shopping cart 105 can be updated to include the additional bags. It will be understood that the Bags button may also be used to delete unused bags. The display 110 can also include a Done button to complete shopping such that the system may finalize the respective calculated weights of each bag in preparation for auditing and the total cost for each bag in preparation for payment. Accordingly, the display 110 can also include a Pay button to authorize payment after audit and/or checkout is completed.

It will be understood that the mobile device 100 may be a personal mobile device such as a cellular telephone or an electronic device provided by the store, both of which are configured for scanning items, entering and displaying information according to the embodiments described herein.

Figure 2A:
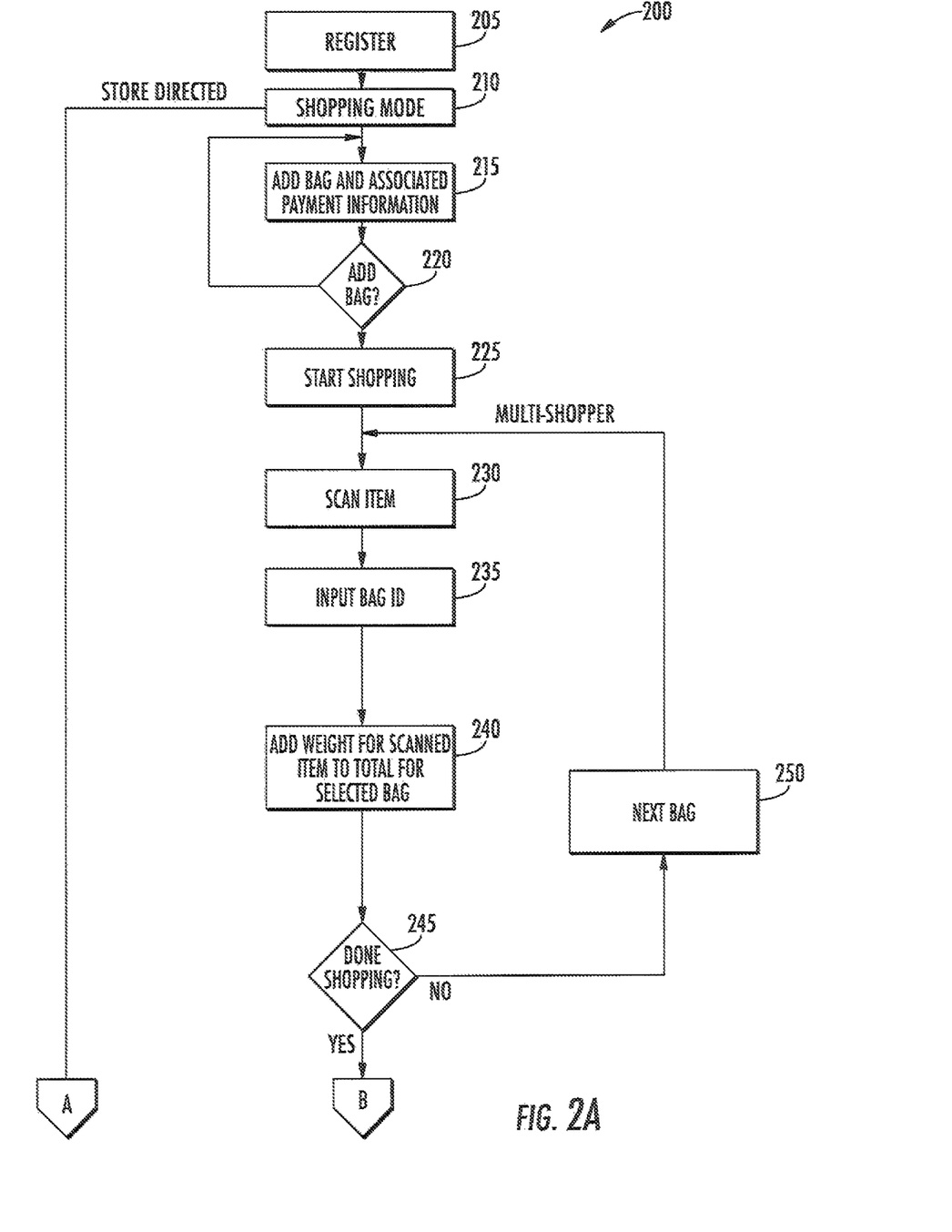
FIGS. 2A and 2B are flowcharts illustrating operations of an audited shopping system in a multi-shopper configuration in some embodiments according to the invention.
Figure 2B:
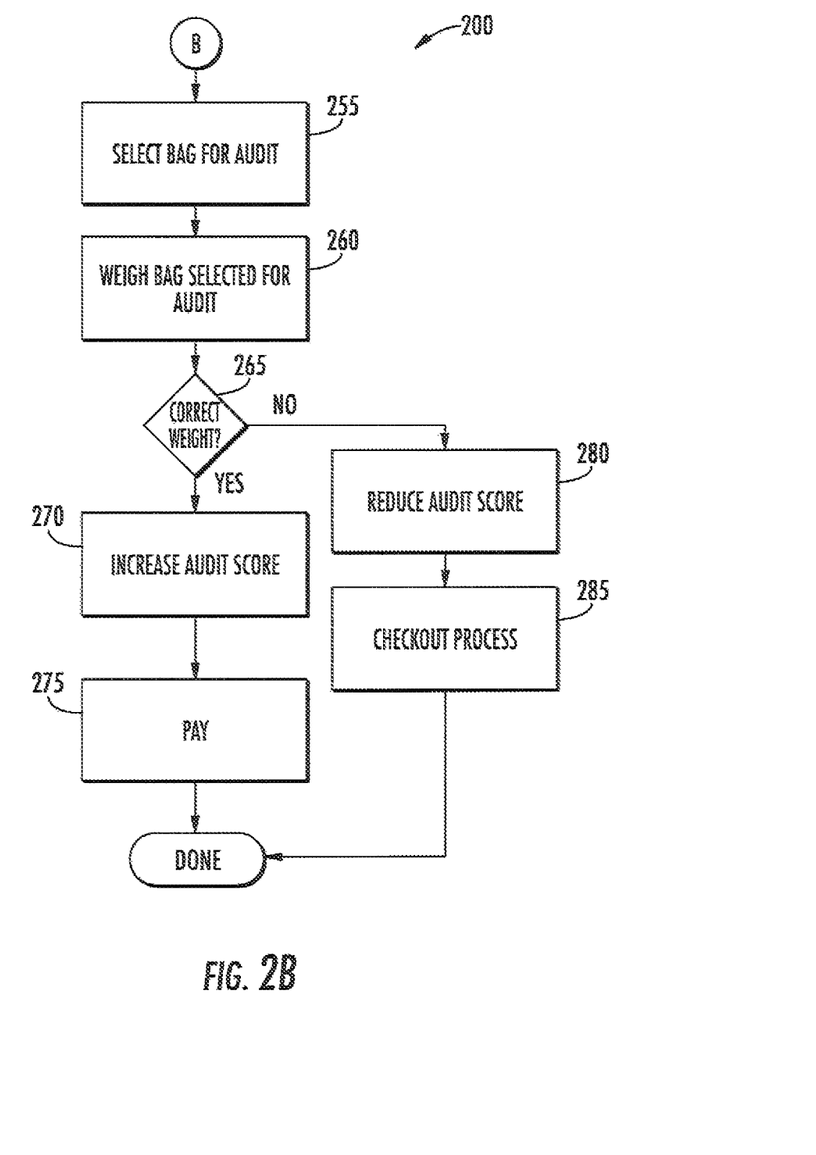

FIGS. 2A and 2B are flowcharts that illustrates operations of an audited shopping system 200 in multi shopper mode in some embodiments according to the invention. As shown in FIG. 2A, the system operation begins when the shopper registers with the system (block 205) to which can identify the shopper in a loyalty program and include payment information for one or more parties. The shopper then selects multi shopper mode (block 210). The shopper can then select a number of bags for the shopping cart 105 and associated payment information to be used for each bag (block 215). Alternatively, the shopper can add bags incrementally (block 220) wherein processing continues until a sufficient number of bags has been added Shopping begins (block 225) as the shopper scans a particular item (blocked 230) and selects the bag in which the item is placed (block 235) which can be provided by selecting the appropriate icon, entering or saying the number of the bag. The system can determine a running total of the weight of each bag in the shopping cart 105 based on the weight information that is associated with each scanned item (block 240) by accessing a database. This process continues until an indication is provided that shopping is finished (block 245) via, for example the Done button, otherwise shopping continues as the next item is scanned (block 250).

When shopping is completed (block 245) operations continue as further shown in FIG. 2B wherein the audited shopping system 200 selects one (or more) of the bags for the an audit process (block 255). The selected bag is weighed (block 260) and the measured weight of the bag is compared to the weight that calculated by the system based on the items that were scanned and assigned to the audited bag (block 265). If the weights are approximately equal (block 265) the audit score for the shopper can be increased (block 270) and the shopper can then be prompted for payment (block 275). If, however, the weight of the audited bag does not equal the calculated weight of the bag (block 265) the shopper's audit score can be reduced (block 280) and a normal checkout process can be conducted for the shopper (block 285).

Figure 3A:
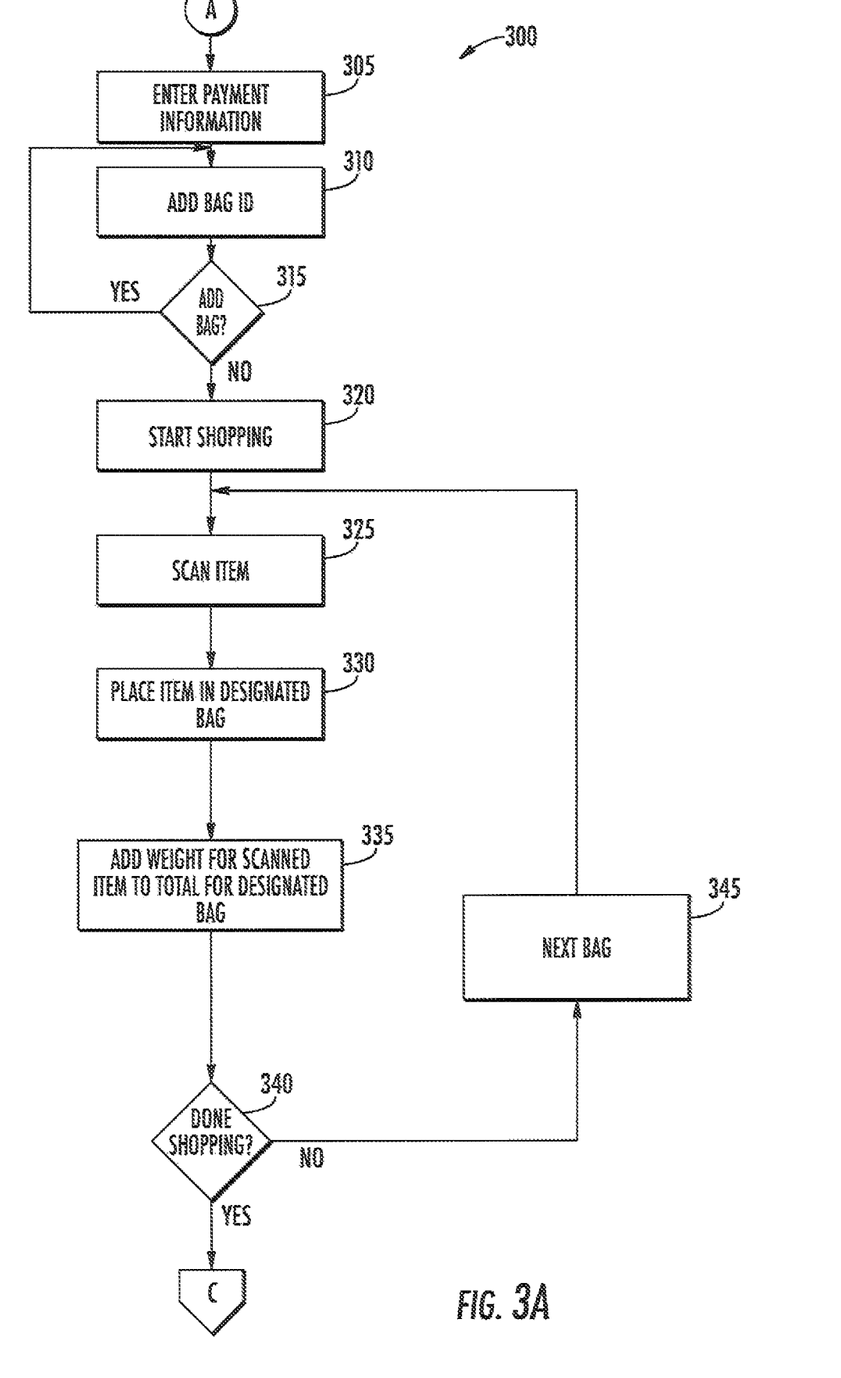
FIGS. 3A and 3B are flowcharts illustrating operations of an audited shopping system in an audit shopper configuration in some embodiments according to the invention.
Figure 3B:
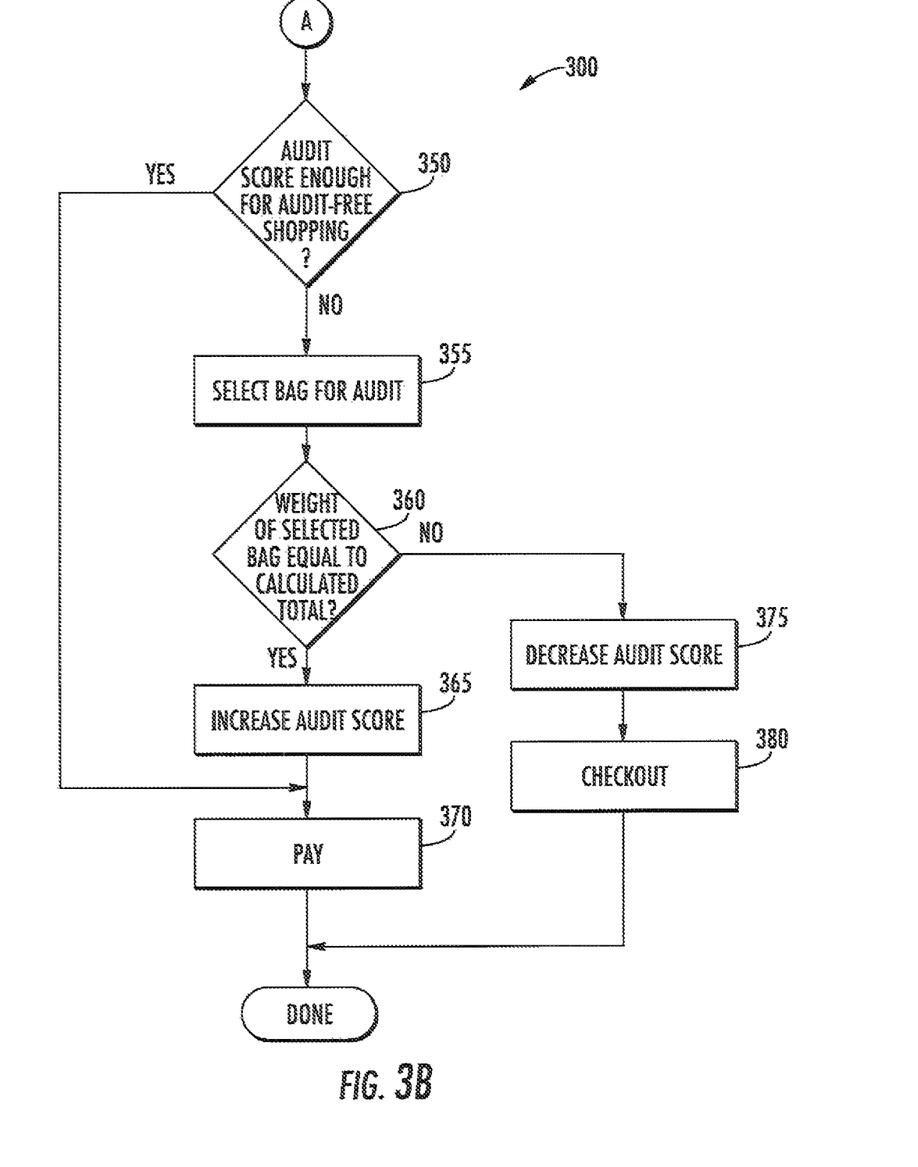

FIGS. 3A and 3B are flowcharts illustrating operations of an audited shopping system in audit shopper mode in some embodiments according to the invention. In audit shopper mode the system directs how the scanned items are to be bagged during shopping. Accordingly, the shopper can begin by entering payment information (block 305) and the shopper can then add a number of bags (block 310 and block 315) until a sufficient number of bags has been added to the shopping cart 105. It will be understood that when a bag is added to the shopping cart 105, a bag icon can be added to the cart 105 on the display 110.

The shopping begins (block 320) and the shopper scans a particular item (block 325) and the system directs the shopper to place the scanned item in a designated bag (block 330). The system calculates the weight for that bag (and the other bags) as the scanned items are added to the bags based on the weight information associated with each of the scanned items (block 335). This process continues until the shopper provides input indicating that the shopping trip is finished (block 340 and 345).

According to FIG. 3B, the system may check to determine whether the shopper's audit score is sufficient to allow the shopper to skip the audit process (block 350). If the shopper's audit score is sufficient, the system can direct the shopper to pay and skip the audit process (block 370). If, however, the system determines that the shopper's audit score is insufficient to allow an audit free checkout, the system can direct the shopper to proceed to auditing where at least one bag is selected for audit (block 355).

The selected bag is weighed and the measured weight is compared to the calculated weight for the selected bag (block 360). If the weights are about equal (block 360), the audit score for the audit shopper is increased (block 365) and the shopper is directed to pay (block 370). If, however, the weight of the selected bag and the calculated weight of the selected bag are not about equal (block 360) the audit score of the audit shopper is decreased (block 375) and a normal checkout process is conducted for the shopper (block 380).

Figure 4:
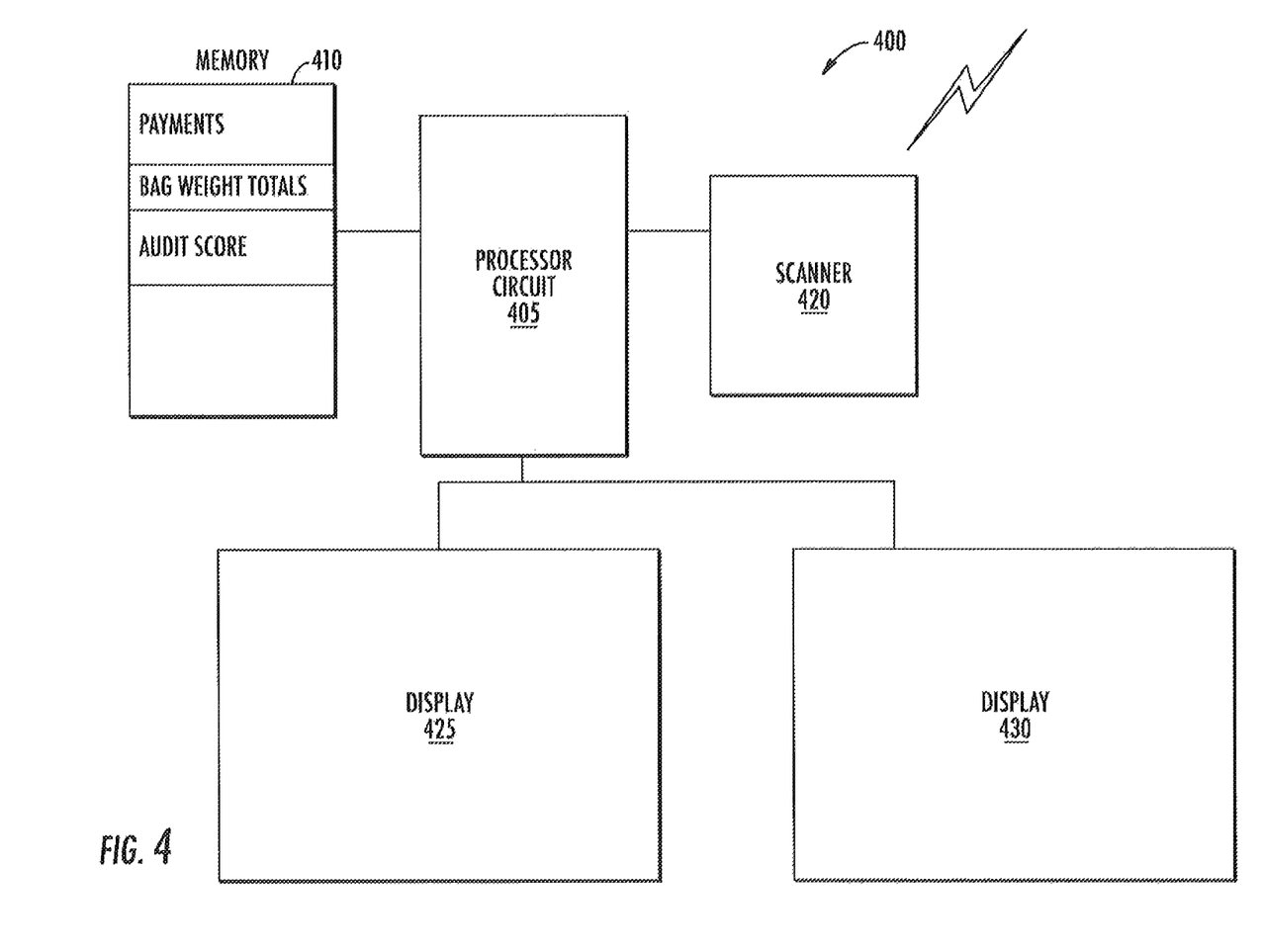
FIG. 4 is a block diagram of a mobile device configured to operate in an audited shopping system in some embodiments according to the invention.

FIG. 4 is a block diagram of a mobile device 400 utilized as part of the audited shopping system in some embodiments according to the invention. According to FIG. 4, a processor circuit 405 coordinates overall operations of the mobile device 400. In particular the processor circuit 405 can access a memory 410 which holds information such as payment information for the shopper and other parties, bag weight totals for scanned items, an audit score for the particular shopper, and other data.

As further shown in FIG. 4, the mobile device 400 can also include a display 425 that can used to provide, for example, the representations shown in FIG. 1 on the display 110. It will be further understood that the input 430 can also be provided via the display 110. Still further, the mobile device 400 can include a scanner 420 such as a barcode scanner or other optical device that allows product identification information to be captured by the device 400 and forwarded to the system for operations of the audited shopping system.

Figure 5A:
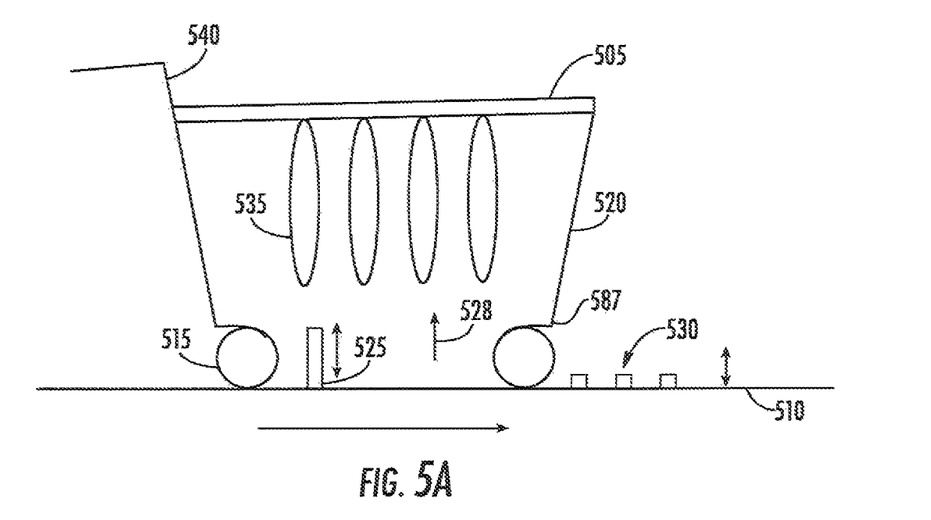
FIG. 5A/5B is schematic illustration of a shopping cart configured to operate in an audited shopping system in some embodiments according to the invention.
Figure 5B:
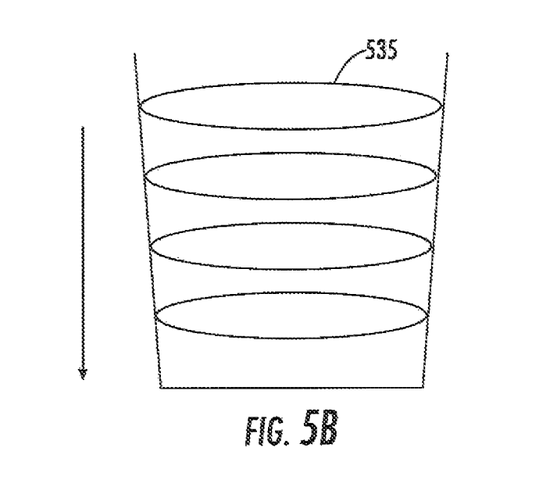

FIGS. 5A and 5B are schematic illustrations of a side view and top view of a shopping cart 505 that is configured for use in conjunction with the audited shopping system in some embodiments according to the invention. In particular, the shopping cart 505 includes a frame 520 and handle 540 as well as rails 541 that are opposite one another. The rails are configured to allow bags 535 to be hung from the rails within the frame 520. As further shown in FIGS. 5A and 5B the shopping cart 505 includes a base 527 that is part of a lower portion of the frame 520 that is proximate to a level surface 510 on which the shopping cart 505 may roll using wheels 515.

According to FIG. 5A the shopping cart 505 can be pushed in the direction 501 towards the audit station as part of the audited shopping system. Once the shopping cart 505 is in a position such that an open portion 528 of the frame 520 is positioned over a weight cell 525, the shopping cart 505 may be stopped at a selected position by a particular one of the stops 530 that extend from the level surface 510 to stop the front wheel 515 in the correct location relative to the weight cell 525. During auditing the weight cell 525 can be extended from the level surface 510 through the open surface 528 of the frame 520 to contact the bag 535 selected for auditing that is directly opposite the position of the weight cell 525 to determine the weight of the contents. The weight of the bag 535 can be transmitted to the system for comparison. As shown in FIGS. 2B and 3B, different actions can be taken based on the comparison of the measured weight of the bag to the calculated weight of the beg.

As described herein, an audited shopping system can be provided whereby the shopper places the scanned items in particular bags so that the system can determine which scanned items are in which of the shopper's bags. In this way, when an audit is conducted, a particular one (or ones) of the shopper's bag can be selected for weighing. The audited shopping system can compare the calculated weight of the contents of a particular bag(s) with the actual measured weight of that bag(s) to determine compliance.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eifel, JADE, Emerald, C++, C#, VB.NET, Python or the like, conventional procedural programming languages, such as the "C" programming language, Visual Basic, Fortran 2003, Per, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof; and the scope thereof is determined by the claims that follow.

What is claimed:

1. A non-transitory computer-readable medium whose contents, when executed by a computing system, cause the computing system to perform operations for an audited shopping system comprising:
   receiving scanned product information identifying a current product and an associated weight of the current product;
   determining an indication to place the current product in a selected bag among a plurality of bags;
   adding the associated weight of the current product to a previous calculated weight of products in the selected bag to provide a current calculated weight of products in the selected bag; and then
   repeating all previous operations until receiving an indication that shopping is done to provide a plurality of products that are distributed among the plurality of bags, wherein each bag has a respective calculated weight of all products in the bag;
   indicating a selected one of the plurality of bags as an audited bag for weighing.

2. The non-transitory computer-readable medium of claim 1 wherein the determining the indication to place the current product in the selected bag among the plurality of bags comprises receiving input from a shopper to provide the selected bag.

3. The non-transitory computer-readable medium of claim 1 wherein the determining the indication to place the current product in the selected bag among the plurality of bags comprises receiving input from a remote server configured to determine a distribution for scanned products for placement into the plurality of bags.

4. The non-transitory computer-readable medium of claim 3 further comprising:
   displaying the indication to place the current product in the selected bag on a screen configured for viewing by a shopper.

5. The non-transitory computer-readable medium of claim 1 further comprising:
   comparing a weight of the audited bag to a calculated weight of the selected one of the plurality of bags.

6. The non-transitory computer-readable medium of claim 5 further comprising:
   receiving registration information for a shopper before receiving the scanned product information; and
   increasing an audit score associated with the shopper if the weight of the audited bag is about equal to the calculated weight of the selected one of the plurality of bags; and
   decreasing the audit score associated with the shopper if the weight of the audited bag is not about equal to the calculated weight of the selected one of the plurality of bags.

7. The non-transitory computer-readable medium of claim 5 further comprising:
   receiving registration information for a shopper before receiving the scanned product information; and
   indicating audit-free shopping to the shopper for a next shopping trip responsive to determining that an audit score associated with the shopper is sufficient; and
   preventing indicating audit-free shopping to the shopper for the next shopping trip responsive to determining that the audit score associated with the shopper is insufficient.

8. A method of operating an audited shopping system comprising:
   receiving scanned product information identifying a current product, an associated weight of the current product, and an associated price of the current product;
   receiving an indication from a shopper to place the current product in a selected bag among a plurality of bags in a shopping cart;
   adding the associated weight of the current product to a previous calculated weight of products in the selected bag to provide a current calculated weight of products in the selected bag;
   adding the associated price of the current product to a previous calculated price of products in the selected bag to provide a current calculated cost of products in the selected bag; and then
   repeating all preceding operations until receiving an indication that shopping is done to provide a plurality of products that are distributed among the plurality of bags, wherein each bag has a respective calculated weight of all products in the bag and a respective calculated cost of all products in the bag; and
   indicating a selected one of the plurality of bags as an audited bag for weighing.

9. The method of claim 8 further comprising:
   receiving registration information for the shopper;
   receiving an indication from the shopper to add a plurality of bags to a shopping cart and respective payment information for each of the plurality of bags; and
   paying the respective calculated cost of all products in each bag using the respective payment information for each of the plurality of bags.

10. The method of claim 8 further comprising:
   comparing a weight of the audited bag to a calculated weight of the selected one of the plurality of bags.

11. The method of claim 10 further comprising:
   increasing an audit score associated with the shopper if the weight of the audited bag is about equal to the calculated weight of the selected one of the plurality of bags; and
   decreasing the audit score associated with the shopper if the weight of the audited bag is not about equal to the calculated weight of the selected one of the plurality of bags.

12. The method of claim 11 further comprising:
   indicating audit-free shopping to the shopper for a next shopping trip responsive to determining that an audit score associated with the shopper is sufficient; and preventing indicating audit-free shopping to the shopper for the next shopping trip responsive to determining that the audit score associated with the shopper is insufficient.

13. A method of operating an audited shopping system comprising:

receiving scanned product information identifying a current product, an associated weight of the current product, and an associated price of the current product;

determining which one of a plurality of bags in a shopping cart of a shopper in which to place the current product to provide a selected bag at a remote server, adding the associated weight of the current product to a previous calculated weight of products in the selected bag to provide a current calculated weight of products in the selected bag;

adding the associated price of the current product to a previous calculated price of products in the selected bag to provide a current calculated cost of products in the selected bag; and then repeating all preceding operations until receiving an indication that shopping is done to provide a plurality of products that are distributed among the plurality of bags, wherein each bag has a respective calculated weight of all products in the bag and a respective calculated cost of all products in the bag; and indicating a selected one of the plurality of bags as an audited bag for weighing.

14. The method of claim 13 further comprising:

receiving registration information for the shopper;

receiving an indication from the shopper to add a plurality of bags to a shopping cart and respective payment information for each of the plurality of bags; and paying the respective calculated cost of all products in each bag using the respective payment information for each of the plurality of bags.

15. The method of claim 13 further comprising:

comparing a weight of the audited bag to a calculated weight of the selected one of the plurality of bags.

16. The method of claim 15 further comprising:

increasing an audit score associated with the shopper if the weight of the audited bag is about equal to the calculated weight of the selected one of the plurality of bags; and decreasing the audit score associated with the shopper if the weight of the audited bag is not about equal to the calculated weight of the selected one of the plurality of bags.

17. The method of claim 16 further comprising:

indicating audit-free shopping to the shopper for a next shopping trip responsive to determining that an audit score associated with the shopper is sufficient; and preventing indicating audit-free shopping to the shopper for the next shopping trip responsive to determining that the audit score associated with the shopper is insufficient.

* * * * *

UNITED STATES PATENT AND TRADEMARK OFFICE
CERTIFICATE OF CORRECTION

| | | |
|---|---|---|
| PATENT NO. | : 10,810,568 B1 | Page 1 of 1 |
| APPLICATION NO. | : 16/369816 | |
| DATED | : October 20, 2020 | |
| INVENTOR(S) | : Wood et al. | |

It is certified that error appears in the above-identified patent and that said Letters Patent is hereby corrected as shown below:

On the Title Page

Item [65]:
Insert -- Prior Publication Data US 2020/0311706-A1 Oct. 1, 2020 --

In the Specification

Column 6, Line 67:
"of the beg." should read -- of the bag. --
Column 8, Line 14:
"Fortran 2003, Per, COBOL" should read -- Fortran 2003, Perl, COBOL --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*